(12) United States Patent  (10) Patent No.: US 8,408,000 B2
Cohen  (45) Date of Patent: Apr. 2, 2013

(54) PENDULAR ENGINE

(76) Inventor: Albert Cohen, Clichy (FR)

( * ) Notice: Subject to any disclaimer, the term of this patent is extended or adjusted under 35 U.S.C. 154(b) by 0 days.

(21) Appl. No.: 12/808,962

(22) PCT Filed: Jan. 8, 2009

(86) PCT No.: PCT/FR2009/000012
§ 371 (c)(1),
(2), (4) Date: Sep. 19, 2010

(87) PCT Pub. No.: WO2009/112666
PCT Pub. Date: Sep. 17, 2009

(65) Prior Publication Data
US 2011/0131987 A1    Jun. 9, 2011

(30) Foreign Application Priority Data

Jan. 9, 2008    (BE) .................................. 2008/0013

(51) Int. Cl.
*F01K 25/00*    (2006.01)
*F01K 13/00*    (2006.01)

(52) U.S. Cl. .......................................... 60/671; 60/676

(58) Field of Classification Search ...... 60/641.1–641.7, 60/645–684, 516–526, 641.8–641.15; 415/916
See application file for complete search history.

(56) References Cited

U.S. PATENT DOCUMENTS

| 4,286,434 A | * | 9/1981 | Moisdon | 60/641.7 |
| 4,382,365 A | * | 5/1983 | Kira et al. | 60/675 |
| 6,434,942 B1 | * | 8/2002 | Charlton | 60/641.11 |
| 2005/0199747 A1 | | 9/2005 | Roarty | |

FOREIGN PATENT DOCUMENTS

| DE | 942 031 C | 4/1956 |
| DE | 10 2004 040730 B3 | 11/2005 |
| GB | 2 436 129 A | 9/2007 |
| WO | WO 93/16271 A | 8/1993 |
| WO | WO 2006/097089 A | 9/2006 |

OTHER PUBLICATIONS

International Type Search Report, Dec. 18, 2008, from International Phase of the instant application.

* cited by examiner

*Primary Examiner* — Kenneth Bomberg
*Assistant Examiner* — Christopher Jetton
(74) *Attorney, Agent, or Firm* — Jacobson Holman PLLC (57) ABSTRACT

Pendular and differential periodic heat engines with theoretical efficiencies of ONE, and industrial efficiencies close to ONE, exclusively subordinate to the physical constraints inherent in any material device under ordinary conditions of use, operating with recirculation of the gases in closed loops between a thermodynamic pendulum (2/2, 2/4) made up of a chamber (1/2, 1/4) fitted with a piston (2/2, 2/4) connected to a free flywheel (3/2), and a regulated supply of heat (10/4, 10/4, etc.) positioned some distance away from the chamber of the thermodynamic pendulum (FIG. 2), with extension to turbine engines (FIG. 5) thanks to phase changes.

9 Claims, 4 Drawing Sheets

PENDULAR ENGINE

FIELD OF THE INVENTION

Contrary to popular belief, it is possible to obtain industrial thermodynamic conversions with theoretical efficiencies of ONE from a single heat source, like in human muscle, and close to ONE in common industrial uses. Such conversions can be acquired for all powers, starting from any temperature, without violating Nernst's law.

BACKGROUND OF THE INVENTION

Of course, it is absolutely unreasonable to hope for this from current devices. Such conversions become possible, however, by means of an unprecedented device: A thermodynamic pendulum, adiabatic and isentropic by definition, simultaneously overloaded with heat and unloaded with work during the adiabatic expansion of gases.

SUMMARY OF THE INVENTION

The first thermodynamic conversion, i.e., the adiabatic thermodynamic pendulum is pendular and reversible by definition. It serves as a cradle to the second: thermal overload. The heat/work efficiency of the first is conventional $(T_1-T_2)/T_1$. The efficiency for the simultaneous thermal overload is ideally one. A second application extends the process to gas turbines by means of phase changes of the gases circulating in return circuits.

The patent illustrates here a novel and unprecedented design for the conversion of heat into work in fundamental thermodynamics. Accordingly, the principle will be explained first, and the theoretical feasibility will be demonstrated, and then the industrial aspects in current uses will be described.

A thermodynamic pendulum is a device exchanging heat for work, and then reciprocally the reverse, exchanging work for heat in a periodic pendular cycle that is perpetual in theory, since it is by definition adiabatic, like any theoretical pendular movement. There is no exchange with the external environment of either heat, work or gas. In industrial use, it is possible to artificially produce a perpetual, true pendular movement by means of maintenance corrections, since no physical installation is perfect and any oscillation is doomed to be damped spontaneously unless it is maintained, since it is produced in a concrete physical medium.

Hereinafter we give by way of example, an example of an ideal thermodynamic pendular movement without prejudice to any other assembly.

DETAILED DESCRIPTION OF THE PREFERRED EMBODIMENTS

Figure 1:
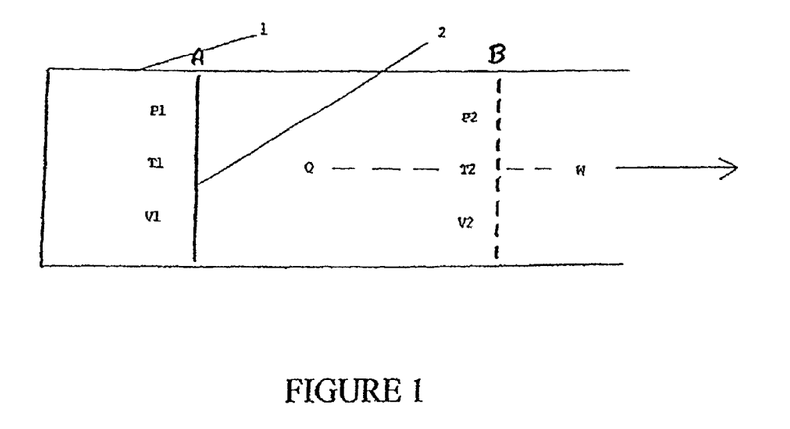
FIG. 1 is a schematic illustration of a cylindrical chamber filled with gas.

Take a conventional cylindrical chamber (1/1) filled with gas and sealed by a piston (2/1). This piston is capable of sliding inside (FIG. 1). The force of the gases under pressure causes piston (2/1) to slide along its path from an initial point A (FIG. 1) to a final point B. At A its pressure is P1, its temperature is T1 and the volume occupied by the gases is V1. The force of the gases communicated to the piston produces work W between A and B. This work has a theoretical efficiency of $(T_1-T_2)/T_1$, since at B its new pressure P2 is lower than P1, its new temperature T2 is lower than T1 and the new volume occupied by the gases V2 is greater than V1 (FIG. 1). When the piston reaches B in the device of FIG. 1, the thrust forces exerted by the piston and the external resistances in the chamber equilibrate. The movement of the piston stops. It is reversible, as long as, naturally, all the work W exploited between A and B by the gas expansion is returned to the piston (FIG. 1) to allow it to return to the initial state of the system (P1, V1, T1, piston back at point A). So far, this is all very commonplace.

Figure 2:
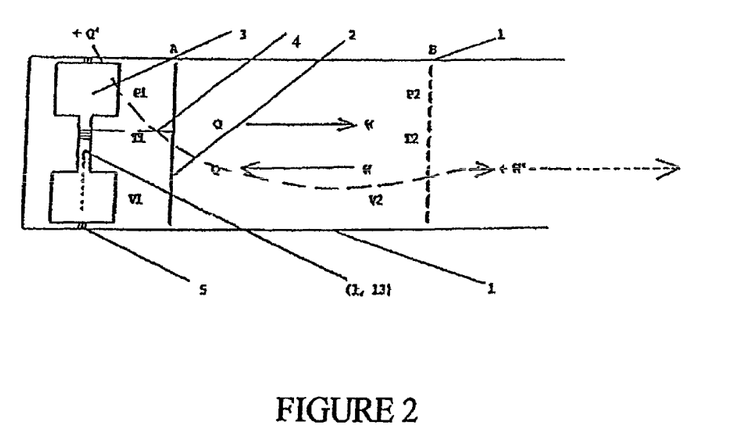
FIG. 2 is a schematic illustration of another chamber having a flywheel.
Figure 3:
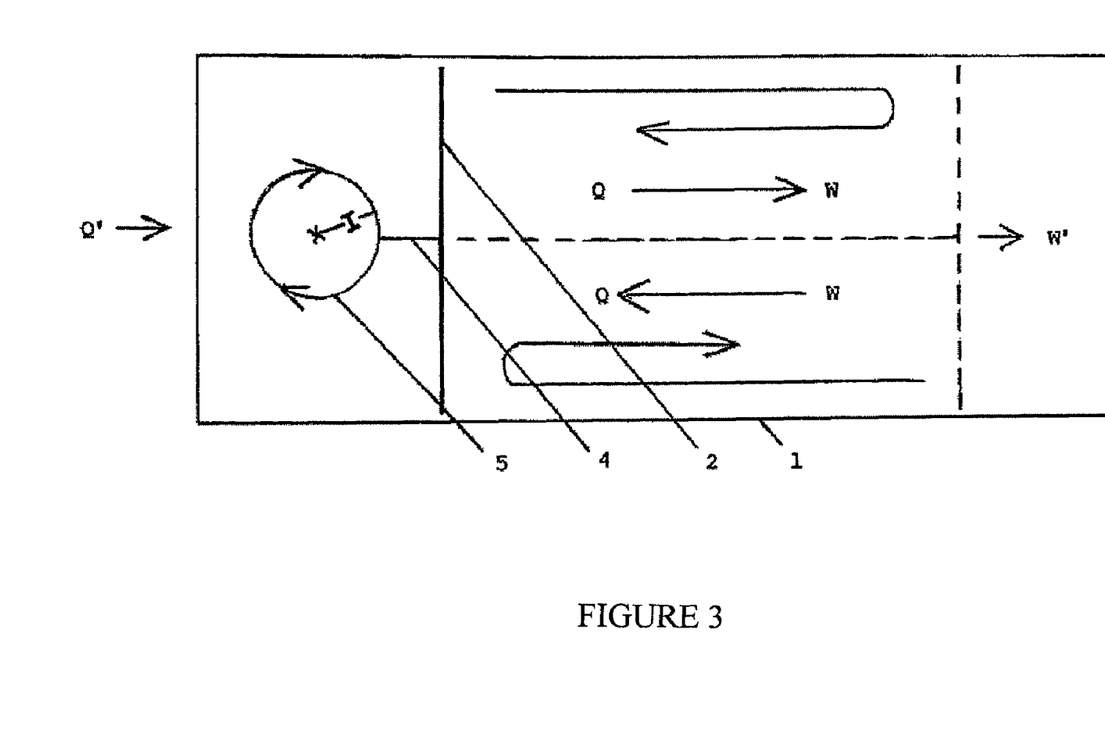
FIG. 3 is a plan view illustrating rotation of the flywheel and movement of a piston.
Figure 4:
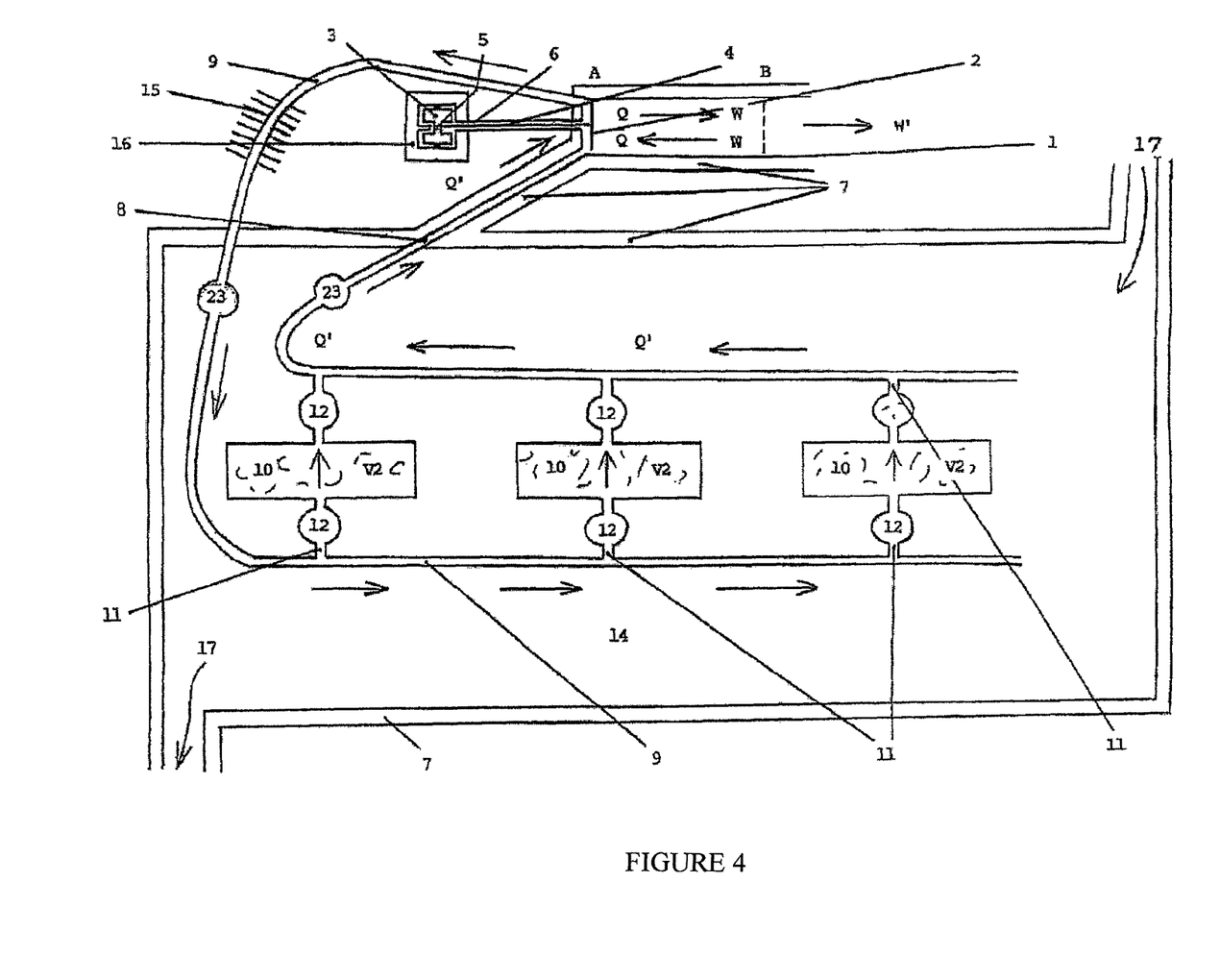
FIG. 4 illustrates an example of one embodiment of the present invention.

We will now put a free flywheel (3/2) in such a chamber (1/1), whose axis of rotation (5/2) will be perpendicular to the movements of the piston, and when the piston occupies position A, the closest position to it, we will connect the axis of rotation of the flywheel (5/2) to the piston by means of a connecting wire (4/2) according to FIGS. 2, 3 and 4. The piston can move from position A to a position B, because we will give this wire the length AB + the length of the distance separating the piston from the flywheel (FIGS. 2, 3 and 4) when the piston occupies position A closest to it. When the piston is at A, we tightly wind all of the free part of this wire (i.e., length AB) around the axis of rotation of flywheel (5/2) by one of its ends and connect the other end to the piston (2/2, FIG. 2), and then we pressurize the gases. As soon as we release the wired system under pressure, the thrust of the pressurized gases on the piston will cause the flywheel to rotate, because the piston simultaneously moves between A and B and connecting wire (4/2) wound around the flywheel axis acts on it. Once the piston reaches the end of its path at B, it cannot go any further. Wire 4/2 is then fully stretched between piston (2/2) and flywheel (3/2). At this moment, it first goes from one side to the other of the axis of rotation of the flywheel (5/2, 5/3) on which it then winds in the direction opposite the previous direction (FIG. 3), and the rotation of the flywheel continues its momentum, which serves to pull the piston back by exerting traction from above by means of the wire that is still stretched between the two. From A to B, it is the piston pushed by the gases that acts on the flywheel to rotate it. Once at B, the piston cannot go any further, and since the flywheel continues its momentum and the entirely unwound and still stretched wire changes sides around the axis of rotation of the flywheel, the previously passive flywheel becomes active and acts on the piston to return it, in principle, to its initial position, ideally restoring the pressure to P1 and the temperature to T1 in the initial volume V1 (explained in FIGS. 2 and 3). Once the gases are under pressure again, the movement pauses briefly and the cycle begins a new period, with a reversal of the direction of rotation of the flywheel. The movement is illustrated in FIG. 3.

In principle, a flywheel can restore all the kinetic energy communicated to it. Therefore, it should logically bring the piston back to its initial position and, in principle, restore the chamber to its initial configuration. Thus, a theoretically perpetual thermodynamic pendular movement is obtained. The piston has a perpetual linear oscillation and the flywheel has a reciprocal circular oscillation whose direction changes at each period. Once triggered, such a pendular device is ideally strictly adiabatic and isentropic. In theory, there is no exchange between it and the external environment. In theory, it produces no work and consumes no calories. At A, temperature T1 is higher than at B. At A, pressure P1 is higher than at B. At A, volume V1 occupied by the gases is smaller than at B. Let M be the mass of the gases and C their specific heat. Thus we will have a potential/dynamic cross exchange, theoretically perfectly reversible, of heat into work and, conversely, work into heat in an adiabatic system, alternatively hot and under pressure at A and cold and expanded at B, between the flywheel and the gases of the chamber. We can express the quantity of heat thus exchanged between the flywheel and the piston as an extensive caloric value of calories Q versus work W, rather than an intensive scale value of temperatures T1 and T2 between T1 and T2. Let M be the mass of the gases. Let C be their specific heat.

$$Q=M\times C\times(T1-T2).$$

Thus we have a perpetual cross exchange Q/W/Q . . . etc. In principle, this exchange is perpetual and can be ideally produced without any theoretical energy cost, since, in principle, any pendular movement has an ideally adiabatic potential/dynamic exchange. The description of the final device will now show us how to compensate for the friction forces to go from a perpetual ideal movement to a necessarily imperfect concrete movement.

The assembly given here as an example is reproducible by means of infinite assemblies. The flywheel can be positioned anywhere, as long as it is in permanent opposition to the piston.

Let any expanding gas produce work, as shown in FIG. 1, which gives a simplified conventional schematic version up to the present time of any heat engine converting heat into work. Its initial parameters are: P1, T1, V1 (pressure, temperature, volume). At the end of the expansion cycle, they become P2, T2, V2 (same parameters), as described above. Such an exchange cycle comes from the one-way exchange of calories Q for work W and its theoretical efficiency is well known: it can be written (T1−T2)/T1. This is the theoretical Carnot efficiency. We make no specific comment on it.

We will not use a conventional conversion cycle, FIG. 1, but rather a thermodynamic pendulum cycle such as described in FIG. 2. We will introduce into the adiabatic cycle described in FIG. 2, to promote the exchange of heat for work intended to turn flywheel (3/2), an additional heat load of Q'=Q calories at a higher temperature than T1, either while the piston moves from position A to position B, or just before. We proceed to this heat overload by an artificial means that will be described with the description of a concrete, rather than ideal, cycle. If the gases go from a temperature T1, a pressure P1 and a volume V1 to a final temperature T2 lower than T1 and a final pressure P2 lower than P1 in a final volume V2 greater than V1, we can produce this in such a chamber, by bringing the initial gas temperature to:

T3=T1+(T1−T2) before or during the revolution of the flywheel.

In fact, if T3=T1+(T1−T2)

$$(T3-T1)=(T1-T2).$$

Consequently, Q'=M×C×(T3−T1)=Q=M×C×(T1−T2).

since $(T3-T1)=(T1-T2)$

The practical assembly for heat transfer is explained below with the concrete description of an illustration of the process.

It is perfectly well known that the pressure of a gas in a chamber at constant volume is a function of its temperature. Let delta P=f(delta T).
likewise for any gas whose temperature is increased: delta Px=f(delta Tx).

If we say that:
delta T is equal to M×C×(T1−T2)
and delta Tx equal to M×C×(T3−T1)

$$(T3-T1)=(T1-T2)$$

(delta Tx)=(delta T).

We have the perfect right to do this by bringing T1 to the new temperature T3=T1+(T1−T2).

In principle, the new theoretical pressure obtained by bringing temperature T1 to the new temperature:

$$T3=T1+(T1-T2)$$

will be mathematically P3=P1+(P1−P2)
with the thermal overload bringing the gases of temperature
T1 to temperature T3=T1+(T1−T2) in the exclusive and specific case of our device. This makes:

$$(P3-P1)=(P1-P2).$$

Here, in fact, in the case of our chamber, P3 alone is mentioned. Here it is precisely the same chamber. It is unique, with the same function and the same curve of temperature/pressure variation ratios between two identical invariable limits: point A and point B. A load of additional heat Q' will precisely take the place of the other (Q) taken out between A and B by placing the flywheel in rotation, which does not alter the adiabatic cycle at all, even with variable volume, while the expansion is occurring, in the specific case of our device. The heat load Q is very simply removed from the gases of the chamber by placing the flywheel in rotation and at the same time exactly replaced by the substitution of Q' for Q. If we put the temperatures on the y-axis and the pressures on the x-axis of a curve, the temperature/pressure variation curve will shift toward the bottom by taking away delta T and will simultaneously shift toward the top by substituting delta Tx=delta T at all points of the curve. Consequently, we can write here that P3 is virtual and that if:

(P1−P2) is obtained between T1 et T2:
(P3−P1) is between T3 (actual) and T1 and that:

$$(P3-P1)=(P1-P2),$$

it simply replaces it by addition between A and B without changing the ideal adiabatic cycle.

If the actual pressure differentials are identical for a single chamber producing a single boosted cycle between two unique limits, the work differentials can only be identical.

One heat load exactly replaces the other during expansion of the gases. By bringing its new temperature from T1 to T3 (actual) it can consequently produce new work outside the chamber:

$$W'=W$$

Therefore, we have not considered here the nonlinearity of the relationship between pressures and volumes, like in Amagat's representation, by increasing temperature T1 to bring it to T3.

The adiabatic pendulum chamber here produces its own cold source between the beginning and the end of gas expansion between A and B, because the heat decrease removed by projection into the movement of the flywheel . . . is exactly compensated for.

The heat load placed in reserve by the movement of the flywheel is exactly equivalent to the one used. It will then be positively restored to the chamber gases by the movement of the piston from B to A at the end of the gas expansion.

If we take overload Q' in the form of work while piston (2/1) moves between the two limits A and B, the heat overload allows a second conversion exactly equivalent to the first and this can be used outside the chamber. Finally, we have constructed a clockwork movement of thermodynamic nature that can produce work, not only a clockwork movement that we have boosted.

If, in a conventional cycle, we double the temperature differential by introducing a delta Tx=delta T into it, we do not necessarily double the pressure differential in the temperature/pressure variation curve. A delta P is not equal to a delta T. However, here P3 is virtual and only mentioned. There are not two different curves. There is only one.

This paradox is explained by the fact that the work of placing the flywheel in rotation is performed not by a fixed resistance as in a conventional chamber, but rather a decreasing resistance in a chamber that, although it is adiabatic, has alternatively increasing and decreasing temperatures. As the angular velocity of the flywheel increases, its moment of inertia and the resistance that it opposes also decreases. There is a balance between heat consumption and work production.

In an ordinary chamber, if we want the movement of the piston to be fast, it must have a substantial acceleration gamma correlating with the gamma of the pressure differences, and therefore a large differential between the thrust forces and the resistance forces. Here, this is not the case in the adiabatic chamber that we have modified. Between A and B, delta T=delta P.

If we want to obtain 100% efficiency in an ordinary chamber, an exact balance between thrust forces and heat consumption is required to prevent any waste, i.e., an infinitely slow piston movement tending toward zero or even equal to zero, which would be absurd. Here, our chamber is not inert, if expressed in this way, but in perpetual motion. It imposes its period, its cycle and its own speed on the transformations of the conversion of a heat load Q' into work W'.

Let Qz be the caloric compartment of an ordinary conventional chamber. We seek to convert most of it, i.e., we want to obtain the best efficiency, which is inexorably (T1−T2)/T1 or (Q1−Q2)/Q1. Here, we seek to convert only the equivalent of the usable work resulting from a conventional conversion, and this work production, unlike the other, can be obtained with a conversion efficiency Q=W (Joule's law) of 100%.

If, in a pendular chamber such as described above (FIG. 2), we take precisely all the increase in work W' produced by a heat overload Q' which is immediately removed to be used, we subtract from it all of the increase in incident heat Q'. If we subtract precisely all the additional incident heat introduced in an adiabatic cycle, we do not produce any variations in the cycle. It is certainly no longer adiabatic, since we have simultaneously added to it and subtracted from it exactly the same caloric value converted into work withdrawn, but it will behave exactly as if it were, despite the exchange. Consequently, in FIG. (2) or (4), our flywheel (3/2) should in theory return chamber (1/2, 1/4) exactly to its initial configuration at A (initial P1, V1, T1 remaining unchanged at A), once the work W' produced has been taken out. At this time, it is necessary and sufficient to reload the chamber with a new caloric value Q' thus defined (FIG. 2) by again bringing its final temperature T1 at the end of the period to the new temperature T3=T1+(T1−T2) to convert it again into work ... W'=W, and we can, in principle, begin the operation again indefinitely. This second conversion no longer enters into the classical Carnot thermodynamic conversion pathways ..., regardless of the efficiency of the first conversion (reversible and adiabatic that serves as the cradle). It is equal to it, superimposable, and replaces the first, whose thermal potential for thermodynamic conversion has been simultaneously taken away by the movement of the flywheel and restored by the heat overload that replaces it. One heat load that is taken away is replaced by another that is active on the pressure. The work is both pendular and differential.

As long as we do not load the chamber with a heat overload greater than that of the adiabatic exchange Q/W/Q, we will be able to convert all the overload into work. The new chamber will thus have a lower power, at the limit equal to that of the heat into work exchange capacity of the adiabatic chamber. We can then construct all powers optimally from those possible or desired. Furthermore, we should mention Carnot's theorem of theoretical efficiencies. In this case, in our chamber there is an overload of residual heat T2', T3', etc. . . . at the end of the gas expansion cycle. This is not required.

Unlike the Carnot cycle, which tries to convert most of the heat potential present in a system, here we only claim to convert the heat overload introduced into an isentropic and reversible system, but this second conversion obeys Joule's law, just like the first: Q=W and its theoretical efficiency is 100% (Q'=W').

It is obvious that to create such cycles concretely, additional physical devices need to be considered and physical corrections need to be provided. The adaptation of this new principle of substitution to gas turbines with continuous rather than alternating motion will be dealt with in a second part. They are common to both versions and will be presented in the final description.

DESCRIPTION OF THE DEVICE

Take a cylindrical chamber (1/4) closed at one end in which a mobile piston 2/4) can slide. Note that we will designate this as the main chamber throughout the description. In the bottom of this chamber, a thin communication conduit (6/4) connects it with a second sealed chamber (16/4) into which a flywheel (3/4) is built. Its axis of rotation (5/4) is perpendicular to the movements of the piston (2/4). Chamber (16/4) tightly encloses the flywheel without touching it, so as to leave as little dead space as possible. We connect the axis of rotation of the flywheel (5/4) to the piston by means of a flexible wire (4/4) positioned in the communication conduit (6/4) placed between the two chambers. The piston moves from position A (FIG. 2 for the principle and FIG. 4 for the industrial) against the wall of the main chamber until it occupies the opposite position B. In fact, we will give this wire the length AB + the distance separating the piston from the flywheel when the piston is in position A. The piston is thus trapped between the two limits A and B and can only move between them. We tightly wind all the available wire (4/4) around the axis of rotation of flywheel (5/4) when the piston is found in position A against the bottom of the chamber. The flywheel can be positioned anywhere, as long as its circular movements are always opposed to the linear oscillating movements of the piston and the wire positioned between the two (4/4) is always stretched tight between them. We begin by immobilizing the flywheel and the piston in their respective positions: piston at A and flywheel immobile, with the entire free part of the wire wound around the flywheel's axis of rotation and the remainder stretched between the flywheel and the piston.

Two conduits (8/4 and 9/4) lead into the sealed bottom of main chamber (1/4). The main chamber will be supplied with hot pressurized gas through one of these conduits (8/4) when it is entirely empty with the piston at A, and the expanded and cooled gases will be evacuated through the other conduit (9/4) after their expansion has produced work, when the piston moves from position A to position B. The gases move in a single direction in the device circuit, in the direction of the arrows in FIG. 4). The two conduits will be provided with antireflux valves (23/4) to prevent any gas return. An array of heat exchangers (10/4, 10/4, 10/4, etc.) is set up at a distance to supply the main chamber. Each exchanger chamber has exactly the same volume as the main chamber when the piston that slides it is at the end of its path at B. It is possible to make them smaller, as long as their dysthermic potential Q'=Q is still the same. That is, the heat load delivered to the main chamber is always the same, for example, in the case of a gas phase change that goes from the gas phase to a liquid phase under very high pressure, or in consideration of the temperature of the single source (14/4) in which they are immersed. This should always result in all cases, by building to a higher temperature T3 and at the limit equal to that of the main chamber, when the piston occupies position A to be able to deliver caloric heat to it. The heat supply chambers (10/4, 10/4, ... etc.) of the array are not necessarily immersed in the single heat source 14, but may also be brought to a suitable temperature by heating, for example, solar heating, or by means of a fuel or the like. This secondary chamber (10/4, 10/4, ... etc.) intended in turn to play the role of the hot pressurized gases in the main chamber (1/4) has two private conduits (12/4 and 12/4) provided with non-return valves. The first, downstream, provides passage for the pressurized hot gases to direct them to the main chamber (1/4) in the direction of the arrows, through a single conduit (8/4) common to all the heat exchange chambers (10/4, 10/4, ... etc.) and the second conduit (12/4) through the common conduit (9/4) that serves as the return conduit for the cooled and expanded gases pushed back by the movement of the piston (2/4), after they go into the main chamber (1/4). All the respective communication conduits of each heat supply chamber (10/4, 10/4, ... etc.) lead into the two large collectors (8/4 and 9/4) that they serve. These lead into the bottom of the main chamber (1/4). Antireflux valves (23/4) block the direction of the arrows in which the gases circulate.

We start by arming the device once and for all by producing the temperature T3 and a suitable pressure in all the hermetically-sealed, heat-supplying chambers (10/4, 10/4, ..., etc.). This is defined by the power of the flywheel (3/4) and its capacity to store heat kinetically. The temperature T3 is provided at the single heat source (14/4) by means of a circulation of hot fluids (17/4) or produced in situ, or supplied from the outside, or is self-produced, in the case of a large-capacity, natural heat source. It goes without saying that the temperature in main chamber (1/4) will always and by definition be below that of the parent thermostated heat source. By opening an outlet valve (12/4) of any one of the heat-supplying chambers downstream of the latter in the direction of the arrows, we will provide the main chamber (1/4) with hot pressurized gases. At this time, the main chamber is completely empty. The piston is found against the wall of the bottom in position A, and the flywheel is immobile. The sudden eruption of the gas jet released by one of the heat and pressure-supplying chambers by opening its downstream valve simultaneously places flywheel (3/4) in rotation and allows the main chamber to produce usable work. Once piston (2/4) reaches B, the final pressures equilibrate in both communicating chambers. Then we close the communication level with the calorie-supplying chamber that has just delivered the caloric heat. Simultaneously, we open the valve opposite this same chamber communicating with main chamber (1/4) by the common gas reflux conduit (9/4). The return movement of the piston (2/4) activated by the activated flywheel (3/4) drives the gases into the heat exchanger chamber concerned, which is open at its upstream pole. We close the communication. There, the cooled and expanded gases waiting to be heated in a hermetically-sealed chamber are again in contact with the single heat supply source that is hotter than they are, or they are heated by any available means in a hermetically-sealed chamber where they can be heated again. When the piston returns to start position (A) with all the available wire wound around the flywheel's axis of rotation, we immediately open the downstream valve of the following heat-supplying chamber and start the same operation again. Given that the time for one cycle will be short and that the heating time will be long, if N is the heating time of a chamber and n is the time for one cycle, we will position (N/n+1) chambers in the single source and we will work by circular permutations. When the previous one has delivered its load, the next one will automatically be at the desired temperature. We can thus work continuously.

For a turbine, (FIG. 5), the assembly is simpler. We have a first chamber (18/5) immersed in a heat source where it can acquire the desired temperature and pressure or can be heated externally or internally. This chamber full of liquid gases under high pressure communicates with the upstream hot pole of the gas turbine (19/5) by a single conduit (22/5). Between the two is an intermediate decompression chamber (24/5) where the gases are brought to the gas phase by means of a jet (21/5). Thus, the turbine is continuously supplied with hot pressurized gases by conduit (22/5). At the turbine outlet at its opposite pole in the direction of the arrows in FIG. 5), the same gases exit, cooled and expanded, after having produced work. We will bring them to a temperature and pressure point below their dew point. They then go into the liquid phase again colder than at the inlet into the device. They rain down and are collected in a condensation chamber (20/5) in liquid form, and it suffices to return them to the heating chamber (18/5) by means of a second turbine (25/5) pushing the liquids back, and the device is completed by antireflux valves (23/5) to prevent the reflux of the liquids and gases. Therefore, it is no longer necessary to recompress the gases at the turbine outlet in order to reinject them into the circuit. Liquids are incompressible by nature. Of course, if we consider a concrete, rather than ideal, device, corrections need to be made. These are only due to the material imperfections of the device (friction, excess heat at the turbine outlet, various losses, etc.) and not to considerations of the principle of Carnot's theoretical efficiencies.

We are presented with two scenarios: In the first, called the hot pathway, the heat source and the main chamber are hotter than the environment surrounding them. In the second scenario, which we will call the cold pathway here, the main chamber alone is provided with accessories that work at lower temperature than the natural environment in which they are immersed. In this case, it is the environment: air, water, etc., that can be used as the single main or subsidiary heat source, according to the scenario. Therefore, it is especially important in this case, first of all to protect the main chamber against any counterproductive untimely heating during the gas reflux by the cold pathway and in this case, possibly providing accessory passive cooling means (for example, 15/4 by means of a radiator), or active cooling means, since no isolation will be perfect in either the case of an alternating or a continuous device.

Figure 5:
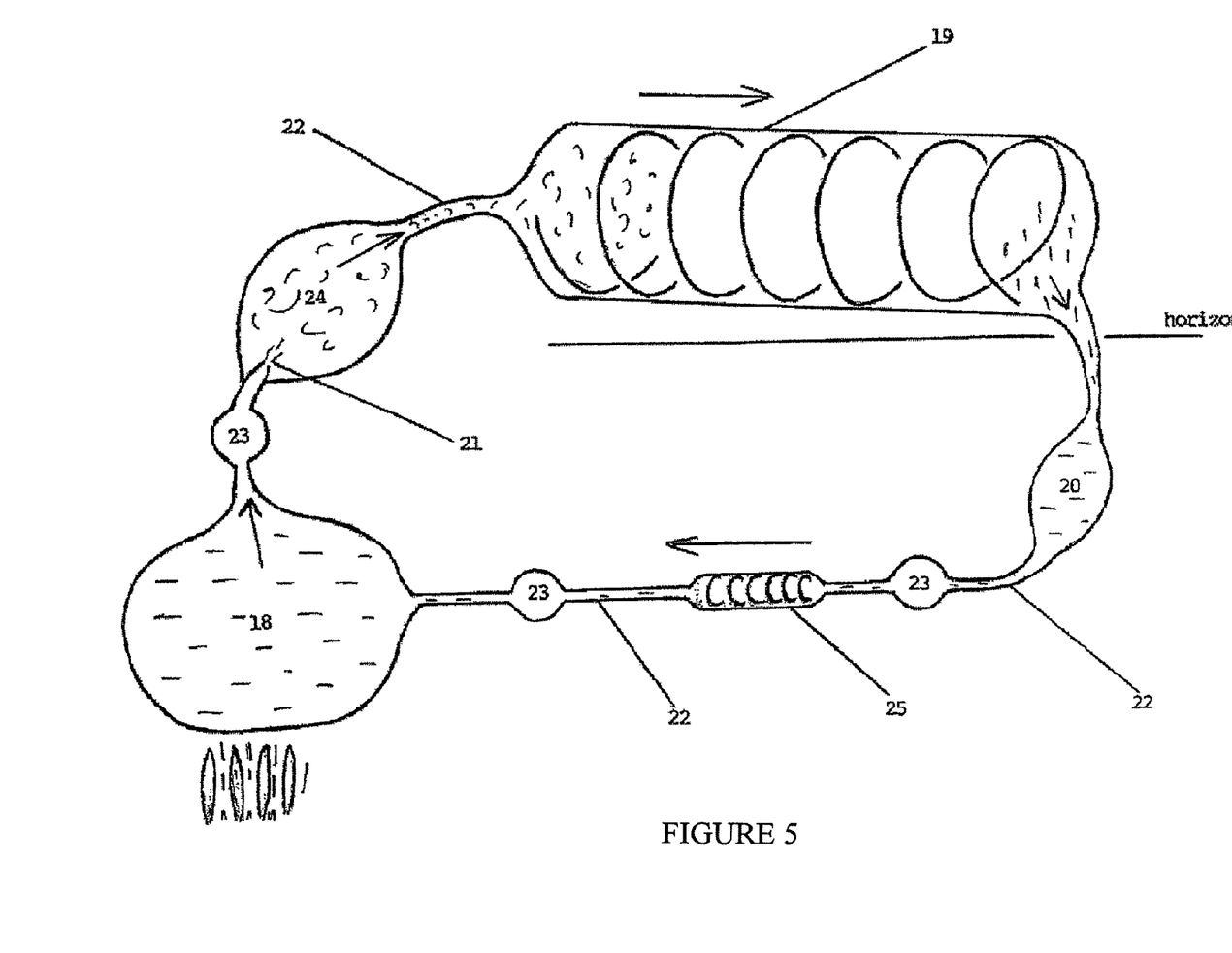
FIG. 5 illustrates an alternative embodiment of the present invention.

In the hot pathway, for example, we are interested in thoroughly isolating the main chamber, which is always hotter than its environment, but only during the gas expansion producing work, both in the case of the alternating main chamber (FIG. 4) and the one for the continuous turbine (FIG. 5). In contrast, during recompression of the gases by the flywheel or their return to the source in liquid form, cooling promotes the reduction of pressure and therefore facilitates the work of the flywheel or the reflux turbine at the expense of a loss of efficiency, certainly, while reheating hinders the return of the gases by increasing their pressure in the return phase. Likewise, we are interested in isolating the feed conduits and the heat-supplying chambers during the gas reflux steps so as not to hinder the movement of the flywheel. We distinguish two steps: the Influx steps corresponding to the influx of the gases into the main chamber whatever it is, during which all heat input is welcome (friction, for example, in the hot phases), as long as it never surpasses the work production capacities of the device, in order to avoid overheating, and conversely, the Reflux steps during which any introduction of heat is negative and counterproductive to the balance sheet. Anything that provides additional heat, whether in the turbine or even in the alternating device in the work production phase, favors efficiency, and, in contrast, anything that provides heat in the recompression phase or in the return to the liquid form of the gases is considered negative in the final industrial balance sheet. Such overheating must be corrected by active or passive cooling means (i.e., 15/4), depending on the scenario. We know very well how to cool a gas and we have motor power. Here, we claim the principle, without making any claim regarding the means to be implemented to cool a gas. These devices are well known and have nothing original about them. Here, it is rather an application of the second principle of thermodynamics: to lower T2, the cold source, for purposes of widening the differential (T1–T2) from below, like in a Watt recuperator, but only to correct the material imperfections resulting from going from an ideal machine to a concrete machine, since no machine is perfect. They do not much harm the final industrial efficiency. Additionally, even in the hot pathway, nothing prevents providing additional heat to the surrounding environment and incorporating it into the cycle by means of accessories making the device more sophisticated. In this case, the efficiency will certainly not be a self-sufficient breeder, . . . but could be a breeder with regard to the active introduction of heat into the heating cycle.

In the cold pathway, the reasoning is reversed. If the chamber is colder than its surroundings, we are interested in exposing it during the work-producing gas expansion, and conversely to isolate it during the reflux and recompression phases. Since it would be impossible to cool a cold device cooler than its surroundings, additional active cooling means must be provided in this case and there will be a poorer efficiency than in the hot pathway, but there can still be advantageous work production, since it does not use active heating (for example, sea water, air, solar, . . . etc.)

We can also conceive of possible alternating exposure/isolation, piece by piece to increase efficiency in more sophisticated devices. These do not seem to make decisive changes in the definitive industrial efficiencies at the expense of technical complications, but are not to be excluded. We mention them as a reminder.

Of course, we account for the various accessories (conduits, heat exchanger chambers, etc.) in the final industrial balance sheet. Rather than provide a tedious inventory here that could go on forever, we will give a rule of thumb to follow that anyone skilled in the art will be able to understand. It seems that the same causal events at different times of the period can become gains or losses depending on the circumstances. These are considered and accounted for below.

Finally, the mobilization of parts and gases will be counted in the final balance sheet.

We have tried to account for all possible causes of degradation of an ideal perfect cycle and to classify them so as to fully demonstrate that we are not ignoring them in any way.

We know Q and W. We can build chambers of any dimensions and any powers as needed and adapt them for any calorie source. Of course, the one must be compatible with the other and we will never be able to produce more work than we have calories at high or low temperatures.

The parent calorie donor source may well be a natural medium. Any fluid conveying calories can be used. We operate in closed circuits. Therefore, the risk of pollution, even heat pollution, is avoided.

Let Q' be the quantity of calories transferred into main chamber (1/4) producing the work or into that of turbine (19, FIG. 5), to be converted into work.

In the Influx phases, let Q1 be all the internal additional heat acquisitions generated in the two pathways due to friction or to walls that are still hot from the preceding cycle, and in the cold pathway, it is the heat additions coming from outside the chamber during the gas expansion as a result of imperfect thermal isolation.

In the Reflux phase, let Q2 be heat lost in the hot pathway by the chamber hotter than its environment, regardless of the mode or the quality of thermal isolation.

In the Reflux phase, let Q3 be all the heat acquired in the cold pathway coming from the outside.

Let Q4, also in the Reflux phases in both pathways, be all acquisitions originating from inside the chamber: hot walls, friction, and in the cold pathway, acquisitions coming from the outside, therefore to be counted in losses beyond the reflux point.

Let Q5=W5 in Joule equivalents be the work spent in the two pathways to move the fluids or gases in their circuits during a cycle, as well as to move the flywheel and the piston or turbine (friction), in their reciprocal oscillations.

Let Q6=W6 in Joule equivalents be the work or cumulative heat losses in the cold pathway, like in the hot pathway, deliberately dissipated by heat loss device (15/4) that we can provide to correct a necessarily imperfect industrial cycle and maintain the movement, whether it is active or passive.

Ultimately, the exploitable work will be in the hot pathways:

$$Wx = Q' + Q1 - (Q2 + Q4 + Q5 - Q6)$$

with a final efficiency:

$$Q' + Q1 - (Q2 + Q4 + Q5 - Q6)/Q'$$

and in the cold pathways:

$$Wy = Q' + Q1 + Q3 - (Q4 + Q5 + Q6)$$

with a final efficiency:

$$Q' + Q1 + Q3 - (Q4 + Q5 + Q6)/Q'$$

The negative effects on efficiency are not prohibitive. The efficiencies no longer depend on Carnot's theoretical efficiency (second principle), but only on the extent to which the devices are improved. As soon as this technique becomes widespread, the greenhouse gas effect from heat engines will be eliminated. It could even be reversed if we draw on the planet's heat reserves. If we use a nuclear, solar or geothermal fuel or a hot natural heat source, pollution will be reduced to nothing, since there will be no exhaust.

The invention claimed is:

1. A pendular thermodynamic conversion device comprising
   a main chamber closed at one end,
   a piston slidably mounted in the main chamber,
   a second sealed chamber,
   a flywheel rotatably mounted in the second chamber,
   a conduit connecting the main chamber and the second chamber, a flexible connector secured to the flywheel and to the piston and extending through the conduit, at least one heat exchanger, a heat source, the at least one heat exchanger being in communication with the heat source, and conduits connecting the at least one heat exchanger and the one end of the main chamber for circulating a medium to and from the main chamber as the piston slides in the main chamber so as to pass the medium heated by the heat source from the at least one heat exchanger to the main chamber and to pass the medium cooled in the main chamber from the main chamber to the at least one heat exchanger.

2. The pendular thermodynamic conversion device according to claim 1, wherein the main chamber is cylindrical.

3. The pendular thermodynamic conversion device according to claim 1, wherein the flywheel is tightly enclosed in the second chamber with minimal dead space.

4. The pendular thermodynamic conversion device according to claim 3, wherein the flexible connector is wire.

5. The pendular thermodynamic conversion device according to claim 4, wherein the wire is wrapped about an axis of rotation of the fly wheel.

6. The pendular thermodynamic conversion device according to claim 1, wherein the medium is circulated in a single direction.

7. The pendular thermodynamic conversion device according to claim 6, wherein the conduits include antireflux valves.

8. The pendular thermodynamic conversion device according to claim 7, wherein the at least one heat exchanger has a volume equal to a volume of the main chamber.

9. The pendular thermodynamic conversion device according to claim 1, wherein a temperature in the main chamber is below a temperature of the heat source.

* * * * *